United States Patent [19]

Born et al.

[11] Patent Number: 4,602,847

[45] Date of Patent: Jul. 29, 1986

[54] METHOD OF PRODUCING OPTICAL ELEMENTS HAVING INTERFERENCE LAYERS

[75] Inventors: Reinhard Born, Bruchköbel; Werner Herbert, Hanau am Main; Hans-Georg Lotz, Erlensee; Norbert Rücker, Northeim, all of Fed. Rep. of Germany

[73] Assignee: Hans Zapfe, Rodgau, Fed. Rep. of Germany

[21] Appl. No.: 616,961

[22] Filed: Jun. 4, 1984

[51] Int. Cl.⁴ .............................. C02B 5/28; C02B 5/22
[52] U.S. Cl. .................................... 350/166; 350/1.6; 427/162
[58] Field of Search ................ 350/163, 164, 165, 166, 350/1.6, 320; 427/162, 164

[56] References Cited

U.S. PATENT DOCUMENTS 2,869,010  1/1959  Gray .................................. 350/164
3,781,090  12/1973  Smith ................................ 350/164

Primary Examiner—John K. Corbin
Assistant Examiner—B. S. Shapiro
Attorney, Agent, or Firm—Felfe & Lynch

[57] ABSTRACT

The invention concerns a method of producing optical elements, in particular filters, with interference layers comprising alternately slightly refractive and highly refractive dielectric layers deposited on a substrate S. The first layer 1 applied to the substrate is $Al_2O_3$, constituting a slightly refractive layer, after which further layers 2 to n of ZnS and $Al_2O_3$ are applied in an alternating sequence. The last layer n consists of $Al_2O_3$. Such layers can be applied, at low temperatures, on flat substrates and, in particular, on sharply curved substrates. Production costs are reduced, and these layers possess the optical properties of known interference layers however resistance to external influences is greatly increased. In the case of mineral substrates, the coatings also offer considerable resistance to boiling.

13 Claims, 2 Drawing Figures

FIG. 1
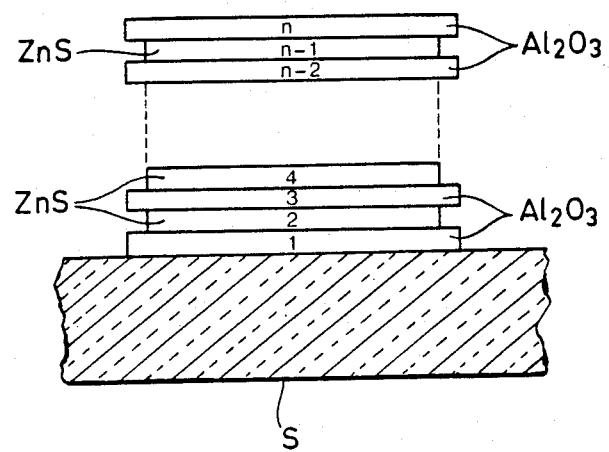
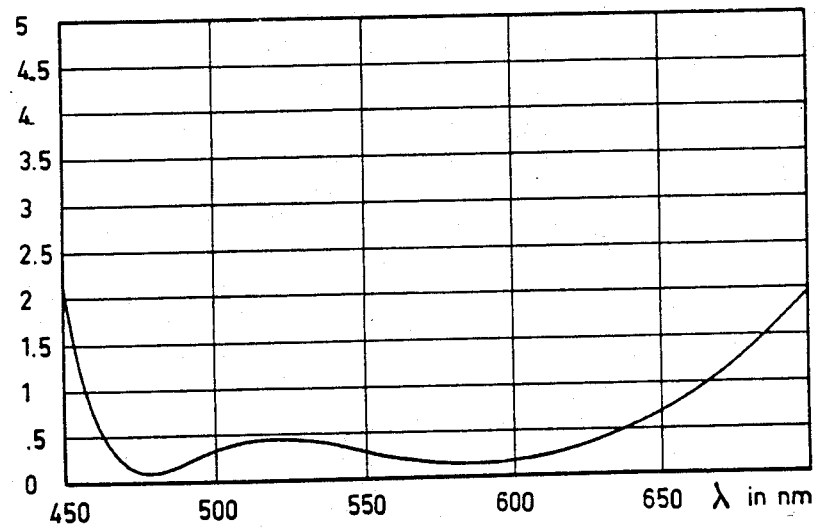
FIG. 2

METHOD OF PRODUCING OPTICAL ELEMENTS HAVING INTERFERENCE LAYERS

The invention concerns a method of producing optical elements comprising interference layers of alternately slightly refractive and highly refractive dielectric materials on organic and inorganic substrates.

The production of interference layers has been known for a long time. Depending upon the requirements imposed on the end product, the thicknesses of the various layers generally lie between $\lambda/4$ and $\lambda/8$ of what is called the reference wavelength for which the system is designed. Examples of end products are optical elements such as subtractive and additive colour-separation filters, cold-light mirrors, heat-reflection filters, colour-temperature conversion filters, colour-temperature conversion reflectors, dielectric narrow-band filters and beam dividers. The substrates used for these purposes consist of transparent or translucent materials such as glass, sapphire and plastics materials, as well as metals. A preferred plastics material is a product known as CR 39, an internationally recognized term for the plastic diallyldiglycolcarbonate.

Optical elements of this kind have to meet specific requirements particularly as regards their optical properties, such as freedom from absorption, stability of the edge deposition etc., and as regards their mechanical and chemical properties such as galling resistance, adhesive strength, resistance to boiling, heat-resistance, as well as resistance to acids etc.

The requirements regarding the abovementioned properties have increased in the course of time, so that the use of "soft" substances such as ZnS and cryolite which can be thermally vaporized, has been abandoned and "hard" oxide layers such as $TiO_2$ and $SiO_2$ for the vaporization of which electron-beam guns are used, have been introduced.

The layer materials previously used for interference layer systems were generally oxides of titanium, providing a highly refractive layer, and oxides of silicon, providing a slightly refractive layer. The vapour deposition operation was usually begun at $<1.3\times10^{-2}$ Pa and at a substrate temperature of between 200° and 350° C. The period required for reaching the stated pressure and a temperature above 250° C. could be as much as 90 minutes. Typical vapour deposition rates were approximately 15 Å/sec for $SiO_2$ and approximately 3 Å/sec for $TiO_2$. The vapour deposition time for the production of 15 layers in the case of a reference wavelength $\lambda_o$ of 400 nm could consequently be as much as 50 minutes in all. Furthermore, the highly heated substrates required a considerable cooling time which could be as much as 150 minutes. The known layer system could not be used either for heat-sensitive substrates such as plastics materials. In the case of flat substrate surfaces, resistance to boiling was in accordance with DIN 58196, Part 2 C 60, and in the case of sharply curved substrates, with DIN 58196 Part 2 C 15. In the case of sharply curved substrates and following treatment as called for in DIN 58196 Part 2 C 15, no adhesive strength at all, as specified in MIL C 675 C, is achieved.

The expressions "C60" and "C15" used in the details regarding resistance to boiling in DIN 58196 Part 2 mean that the layer could not automatically become detached during the boiling time of 60 minutes and 15 minutes respectively. Thus, $TiO_2/SiO_2$ coatings on flat substrates withstood the boiling tests for about 20 hours, but on sharply curved substrates (hemispherical surfaces) for only approximately 15 minutes. This does not, however, means that the layer in question also resists the adhesion strength test in accordance with MIL C 675 C.

In particular, the last-mentioned adhesive strength test indicates specifically that the known layer system, applied to sharply curved substrates such as occur in particular in the case of optical lenses and cold-light mirrors exhibited no adhesive strength at all after a boiling time of only 15 minutes.

The object of the invention is, therefore, to provide a method of producing optical elements which is more economical to operate, enables boiling-resistant and adhesive coatings to be provided even on sharply curved substrate surfaces, and is furthermore suitable for the coating of plastics materials.

According to the invention this object is achieved by a method of producing optical elements, comprising interference layers of alternately slightly refractive and highly refractive dielectric materials on organic and inorganic substrates, the method including the steps of applying to the substrate a first and slightly refractive layer of $Al_2O_3$, applying subsequent layers of ZnS and $Al_2O_3$ in an alternating sequence, and applying a final layer of $Al_2O_3$.

Whereas the application of an $Al_2O_3$ layer as a covering or protective layer is known per se, novelty resides in the subsequent combination of layers including the feature that an $Al_2O_3$ layer is applied to the substrate as a first layer. Surprisingly, it has been found that $Al_2O_3$ is very clearly an advantageous adhesion-inducing medium which also develops its effect when vapour deposition is carried out at a very sharp angle as is the case, for example, at the edge of the hemispherical glass cups. The reverse sequence wherein ZnS is applied as a first layer in no case leads to the advantageous adhesive strength as achieved with the procedure in accordance with the invention. The high adhesive strength and resistance to boiling are quite obviously achieved by the first $Al_2O_3$ layer which acts as an adhesion-promoting medium and which may have a thickness of between 10 nm and 300 nm without resulting in any appreciable fluctuations in the values for adhesive strength and resistance to boiling. The remaining mechanical and chemical properties depend mainly upon the outer $Al_2O_3$ layer which may have a thickness many times greater than the reference wavelength.

The method of the invention is suitable for the production of optical elements which are optically effective at wavelengths of between 0.39 $\mu$m and 6 $\mu$m. It is known per se that ZnS can be used for optical elements that are optically effective between 0.2 $\mu$m (commencement of intrinsic absorption) and 14 $\mu$m. $Al_2O_3$ can be used between 0.2 $\mu$m (commencement of intrinsic absorption) and 7 $\mu$m. However, since $Al_2O_3$ tends to form cracks, the range is narrower for practical reasons. Surprisingly, the tendency to form cracks is so much reduced by the use of "soft" ZnS intermediate layers, that the range can be extended to approximately 6 $\mu$m.

When the method in accordance with the invention is being carried out, the pressure at the commencement of the vapour deposition process may be above $1.3\times10^{-2}$ Pa, for example, in the range between this value and 1.05 Pa. Furthermore, the coating process can be commenced with cold substrates, i.e. substrates at room temperature, so that a pre-heating period is not necessary. Consequently, the time preceding the commencement of vapour deposition is reduced to below 30 minutes; this is one-third of the prior art time mentioned above, assuming the details of the vapour deposition equipment to be identical. Because of the extremely high possible vapour deposition rate of ZnS which typically is approximately 20 Å/sec as compared with approximately 3 Å/sec in the case of $TiO_2$, the deposition time for fifteen layers can be reduced to below approximately 15 minutes. This is again less than one third of the corresponding prior art time mentioned above. Furthermore, as a result of the extremely low substrate temperature, no cooling time is required.

Therefore, given a comparable size of vapour deposition equipment, the number of charges increases roughly three-fold per unit of time, so that very much lower production costs are involved.

The method in accordance with the invention is carried out in a particularly advantageously manner at substrate temperatures of between 20° C. and 180° C., and is expediently used at the lower end of the temperature range. In contrast to the prior art, this creates the possibility of also applying vapour deposits to plastics materials, for example, the material CR 39.

Due to the short pump-off time because of the lower vacuum, and because of the absence of a heating and cooling time and as a result of the higher deposition rates, a considerably shorter operating time—compared with that involved in producing the previous oxide layers—is achieved as previously mentioned.

Although it is known to produce interference layers by applying vapour deposits to substrate surfaces at extremely sharp angles, $MgF_2$ or cryolite, in addition to ZnS, were applied, in a gas dispersion, as the coating material in the earlier systems, and ZnS could also be produced by separately depositing Zn and S vapours. However, the interference layer systems produced in this way have mechanical-chemical and thermal properties which fall well below those of the coatings produced in accordance with the present invention. On the other hand, in the production of layer systems of exclusively "hard" oxide materials, it is found that when the materials are deposited at a sharp angle, the adhesive strength and resistance to boiling gradually drop to zero.

Using the method of the invention, the resistance to boiling on flat substrates as well as on sharply curved substrates (for example hemispherical substrates) were tested in accordance with DIN 58196 Part 2 C 60. In neither case was it found, even after a 60-hour continuous boiling test, that any loosening of the layers or diminution of the galling resistance and adhesive strength takes place, each of these properties being determined in accordance with MIL C675 C.

The low substrate temperature renders it possible, for the first time, to produce all optical elements with thin layers which permit absorption of approximately 1% and may also be made of temperature-sensitive plastics materials, these layers having properties hitherto unknown except in the case of oxide materials. The only exceptions are temperature stability, which is limited by the plastics substrate, and performance in the boiling test.

BRIEF DESCRIPTION OF THE DRAWINGS

FIG. 1 is a diagramatic view of a multilayer coated substrate in accordance with the invention.

FIG. 2 is a graph representing the reflection properties of an embodiment of the invention.

A system of layers formed in accordance with the invention is illustrated in FIG. 1 of the accompanying drawings, in which a substrate, consisting of glass, is designated by the letter S. The numbering of the layers corresponds to the sequence in which they are applied, n designating the top or covering layer which is made of $Al_2O_3$. The layers 1, 3, ..., n-2 and n are of $Al_2O_3$, whereas layers 2, 4 ..., n-1 consist of ZnS.

EXAMPLE 1

Yellow Filters on Glass

A vapour deposition installation, Type 1100 Q (produced by Messrs. Leybold-Heraeus GmbH of Hanau, Federal Republic of Germany), was fitted with disc-like glass substrates and was pumped off to a pressure of approximately 10 Pa in six minutes. The substrates were then cleaned in the known manner by means of a glow discharge. The equipment was then brought to a pressure of $5 \times 10^{-3}$ Pa in a further 14 minutes, whereafter, a dispersing gas consisting of oxygen was introduced to establish a pressure of up to $2 \times 10^{-2}$ Pa. Thereafter, $Al_2O_3$ was degassed with an electron-beam gun for a period of two minutes until the pressure remained stable. Then $Al_2O_3$ was applied as a first layer or adhesion promoting medium at a deposition rate of 13 Å/sec. Adjustment of the rate and control of the screens (for covering the vaporizing means) was carried out by the crystal oscillator method. Following the $Al_2O_3$ layer, the first ZnS layer was deposited at a rate of 10 Å/sec, while the $Al_2O_3$ was held at a raised temperature level by applying a small amount of energy. After the screen for the ZnS vaporizing means (thermal vaporizer) had been closed, the vaporizer means was likewise held at a raised temperature level by the application of a small amount of energy, and the electron-beam gun was again raised to vaporizing capacity. By repeating this coating procedure, a total of 17 separate layers of the condition and thickness indicated below were deposited.

| 1st layer $Al_2O_3$ | 1 × λ/4 for 450 nm | (reference wavelength) |
|---|---|---|
| 2nd layer ZnS | 0.45 × λ/4 for 450 nm | |
| 3rd layer $Al_2O_3$ | 0.9 × λ/4 for 450 nm | |
| 4th layer ZnS | 0.95 × λ/4 for 450 nm | |
| 5th layer $Al_2O_3$ | 1 × λ/4 for 450 nm | |
| 6th layer ZnS | 1 × λ/4 for 450 nm | |
| 7th layer $Al_2O_3$ | 1 × λ/4 for 450 nm | |
| 8th layer ZnS | 1 × λ/4 for 450 nm | |
| 9th layer $Al_2O_3$ | 1 × λ/4 for 450 nm | |
| 10th layer ZnS | 1 × λ/4 for 450 nm | |
| 11th layer $Al_2O_3$ | 1 × λ/4 for 450 nm | |
| 12th layer ZnS | 1 × λ/4 for 450 nm | |
| 13th layer $Al_2O_3$ | 1 × λ/4 for 450 nm | |
| 14th layer ZnS | 1 × λ/4 for 450 nm | |
| 15th layer $Al_2O_3$ | 1 × λ/4 for 450 nm | |
| 16th layer ZnS | 1 × λ/4 for 450 nm | |
| 17th layer $Al_2O_3$ | 2.1 × λ/4 for 450 nm | |

The substrate assumed an average temperature of approximately 50° C.

Pressure was kept constant during the entire process. After the last (17th) layer had been deposited, the vaporizing means was switched off, and the equipment was flushed for a minute after the vaporizing means had cooled.

On all of the substrates, interference layers were obtained which passed the above-described tests as regards galling resistance, adhesive strength and resistance to boiling. Also achieved were an absorption of below 1% and a long-term stability of the edge deposit (sharp drop in the curve for the transmission measurement) of 10 nm from the start-up of the installation to its stoppage.

EXAMPLE 2

Yellow Filters on CR 39

The procedure used in Example 1 was repeated with the single difference that use was made of substrates of the plastics material CR 39 instead of glass substrates. The plastics substrates became heated up from room temperature to approximately 50° C. during the coating procedure. The end product met the optical and mechanical requirements perfectly; it failed only in the boiling test. In particular, excellent resistance to galling and adhesive strength in accordance with MIL C 675 C were achieved.

EXAMPLE 3

Cold-light Mirrors on Hemispherical Surface

The vapour deposition equipment used in Example 1 was provided with substrates for cold-light mirrors made of glass. The hemispherical bodies had a diameter of 32 and 54 mm and a central opening and were of the kind such as is used for projector lamps, for example.

The parameters for evacuation, cleaning by glow discharge and working pressure including the introduction of oxygen as a dispersing gas, as well as the deposition rates for the various layers correspond to those used in Example 1. The "raised temperature level" was such as to permit initiation of spontaneous vaporization, but without the substances concerned being able to develop a vapour pressure sufficient for marked vaporization. By repetition of the various coating procedures, a total of 35 separate layers was deposited to give the condition and thicknesses indicated in the Table reproduced below.

The substrate temperature established itself at approximately 50° C. on average. Pressure was kept constant during the entire process. After the last (35th) layer had been deposited, the vaporizing means was switched off and the equipment was flushed a minute after the vaporizing means had cooled.

On all of the substrates, interference layers were obtained which met the above-described tests as regards resistance to galling, adhesive strength and resistance to boiling. This was the case particularly as regards the cold-light mirrors having a diameter of 32 mm, which are particularly critical as regards resistance to boiling in view of their small radius of curvature. In addition, an absorption of below 1% was obtained as well as long-term stability of the edge deposit of 10 nm from the start-up to the stoppage of the equipment.

| | |
|---|---|
| 1st layer $Al_2O_3$ | 2.27 × λ/4 for 400 nm |
| 2nd layer ZnS | 1.80 × λ/4 for 400 nm |
| 3rd layer $Al_2O_3$ | 1.67 × λ/4 for 400 nm |
| 4th layer ZnS | 1.21 × λ/4 for 400 nm |
| 5th layer $Al_2O_3$ | 1.85 × λ/4 for 400 nm |
| 6th layer ZnS | 1.63 × λ/4 for 400 nm |
| 7th layer $Al_2O_3$ | 1.81 × λ/4 for 400 nm |
| 8th layer ZnS | 1.62 × λ/4 for 400 nm |
| 9th layer $Al_2O_3$ | 1.60 × λ/4 for 400 nm |
| 10th layer ZnS | 1.78 × λ/4 for 400 nm |
| 11th layer $Al_2O_3$ | 1.65 × λ/4 for 400 nm |
| 12th layer ZnS | 1.59 × λ/4 for 400 nm |
| 13th layer $Al_2O_3$ | 1.44 × λ/4 for 400 nm |
| 14th layer ZnS | 1.63 × λ/4 for 400 nm |
| 15th layer $Al_2O_3$ | 1.52 × λ/4 for 400 nm |
| 16th layer ZnS | 1.43 × λ/4 for 400 nm |
| 17th layer $Al_2O_3$ | 1.40 × λ/4 for 400 nm |
| 18th layer ZnS | 1.34 × λ/4 for 400 nm |
| 19th layer $Al_2O_3$ | 1.40 × λ/4 for 400 nm |
| 20th layer ZnS | 1.32 × λ/4 for 400 nm |
| 21st layer $Al_2O_3$ | 1.40 × λ/4 for 400 nm |
| 22nd layer ZnS | 1.46 × λ/4 for 400 nm |
| 23rd layer $Al_2O_3$ | 1.28 × λ/4 for 400 nm |
| 24th layer ZnS | 1.12 × λ/4 for 400 nm |
| 25th layer $Al_2O_3$ | 1.13 × λ/4 for 400 nm |
| 26th layer ZnS | 1.14 × λ/4 for 400 nm |
| 27th layer $Al_2O_3$ | 1.14 × λ/4 for 400 nm |
| 28th layer ZnS | 1.08 × λ/4 for 400 nm |
| 29th layer $Al_2O_3$ | 1.06 × λ/4 for 400 nm |
| 30th layer ZnS | 0.91 × λ/4 for 400 nm |
| 31st layer $Al_2O_3$ | 1.08 × λ/4 for 400 nm |
| 32nd layer ZnS | 1.26 × λ/4 for 400 nm |
| 33rd layer $Al_2O_3$ | 1.05 × λ/4 for 400 nm |
| 34th layer ZnS | 0.55 × λ/4 for 400 nm |
| 35th layer $Al_2O_3$ | 1.06 × λ/4 for 400 nm |

EXAMPLE 4

Antireflex Layers

The vapour deposition equipment used in Example 1 was provided with various sheet-like substrates having the dimensions 50 mm×50 mm×2 mm and consisting of the following materials:
Glass (BK7, a designation used by the German company Schott-Glaswerke, Mainz, West Germany for a glass having an index of refraction of 1.5168)
Polycarbonate ("Makrolon" produced by Bayer)
CR 39.

The process parameters were the same as those of Example 1, with the exception that no oxygen was introduced and that the screens were controlled by photometric measurements.

A total of seven layers, as listed in the following Table, were formed by vapour deposition, and it was regarded as surprising that although two components had refractive indices greater than that of the substrate, perfect dereflection layers could be produced which also posses advantageous mechanical and chemical properties.

| | |
|---|---|
| 1st layer $Al_2O_3$ | 1 × λ/4 for 913 nm |
| 2nd layer ZnS | 1 × λ/4 for 127 nm |
| 3rd layer $Al_2O_3$ | 1 × λ/4 for 556 nm |
| 4th layer ZnS | 1 × λ/4 for 264 nm |
| 5th layer $Al_2O_3$ | 1 × λ/4 for 242 nm |
| 6th layer ZnS | 1 × λ/4 for 619 nm |
| 7th layer $Al_2O_3$ | 1 × λ/4 for 616 nm |

The reflection properties are illustrated in the graph in FIG. 2 of the accompanying drawings, the reflection values being shown as percentages on the ordinate axis. There is a good wide-band dereflection roughly in the zone 460 to 640 nm, and this can be regarded as very good for plastics substrates.

We claim:
1. A method of producing optical elements, comprising interference layers of dielectric materials of alternately a low index of refraction and a high index of refraction on organic or inorganic substrates, the method including the steps of applying to the substrate a first layer of $Al_2O_3$ having a low index of refraction, applying subsequent layers of ZnS and $Al_2O_3$ in an alternating sequence, and applying a final layer of $Al_2O_3$.

2. A method according to claim 1, wherein the first layer is applied when the substrate is at a temperature of 20° to 180° C.

3. A method according to claim 1, wherein the application of the layers is carried out by a vapour deposition process at pressures of between $1.3 \times 10^{-3}$ and 1.05 Pa.

4. A method according to claim 3, wherein $Al_2O_3$ is applied at a vapour deposition rate of between 10 and 15 Å/sec, and ZnS is applied at a vapour deposition rate of between 10 and 30 Å/sec.

5. The method in accordance with claim 1, in which said optical elements are color-separation filters.

6. A method in accordance with claim 1, in which said optical elements are cold-light mirrors.

7. The method in accordance with claim 1, in which said optical elements are heat-reflection elements.

8. The method in accordance with claim 1, in which said optical elements are color-temperature conversion reflectors.

9. The method in accordance with claim 1, in which said optical elements are dielectric narrow-band filters.

10. The method in accordance with claim 1, in which said optical elements are light-beam dividers.

11. The method in accordance with claim 1, in which said substrates comprise glass.

12. The method in accordance with claim 1, in which said substrates comprise sapphire.

13. The method in accordance with claim 1, in which said substrates comprise plastic.

* * * * *

UNITED STATES PATENT AND TRADEMARK OFFICE
CERTIFICATE OF CORRECTION

PATENT NO. : 4,602,847

DATED : July 29, 1986

INVENTOR(S) : Reinhard Born et al.

It is certified that error appears in the above-identified patent and that said Letters Patent is hereby corrected as shown below:

Item [73], "Hans Zapfe, Rodgau," should be -- Leybold-Heraeus GmbH, Köln, --.

Signed and Sealed this

Twenty-eighth Day of April, 1987

Attest:

DONALD J. QUIGG

Attesting Officer

Commissioner of Patents and Trademarks